United States Patent [19]

Raineri

[11] 4,399,825
[45] Aug. 23, 1983

[54] COMBINE HARVESTER WITH AN AXIAL-FLOW THRESHING AND SEPARATING UNIT

[75] Inventor: Giuseppe Raineri, Bassano del Grappa, Italy

[73] Assignee: Pietro Laverda S.p.A., Breganze, Italy

[21] Appl. No.: 270,205

[22] Filed: Jun. 3, 1981

[30] Foreign Application Priority Data

Jun. 19, 1980 [IT] Italy .............................. 53321/80[U]

[51] Int. Cl.³ ............................................ A01F 12/00
[52] U.S. Cl. ................................................. 130/27 S
[58] Field of Search ............................... 56/10.2, 14.6; 130/27 R, 27 P, 27 S

[56] References Cited

U.S. PATENT DOCUMENTS 3,391,523 7/1968 McBain et al. ............... 130/27 R X
3,448,566 6/1969 Van der Lely ............... 130/27 R X
3,527,233 9/1970 Mathews ........................... 56/14.6 X
3,593,719 7/1971 Ashton et al. ................ 130/27 R X
3,659,403 5/1972 Reaves et al. ........................ 56/10.2
3,945,178 3/1976 Delfosse et al. ............. 130/27 R X Primary Examiner—Robert P. Swiatek
Attorney, Agent, or Firm—Sughrue, Mion, Zinn, Macpeak and Seas

[57] ABSTRACT

A combine harvester in which an axial-flow threshing and separating unit is carried transversely of the harvester by a support structure which is fixed releasably to the cutting table of the harvester. This construction enables the combine harvester to be dismantled into three main units—the cutting table, the threshing and separating unit with its support structure, and a rear part of the harvester—so as to simplify considerably the assembly, disassembly and transportation of the harvester.

2 Claims, 3 Drawing Figures

COMBINE HARVESTER WITH AN AXIAL-FLOW THRESHING AND SEPARATING UNIT

The present invention relates to combine harvesters.

In particular, the invention concerns a combine harvester comprising a cutting table, and an axial-flow threshing and separating unit which includes a threshing and separating cylinder, a counter-beater substantially in the form of a concave grille which surrounds a lower part of a first portion of the threshing and separating cylinder, and a separator casing substantially in the form of a tubular grille which surrounds a second portion of the threshing and separating cylinder.

Combine harvesters of the aforesaid type have been known and used for some time. In these machines the harvested crop follows a helical path around the threshing and separating cylinder while moving axially from one end to the other. This produces an efficient threshing action and better grain separation.

The object of the present invention is to provide a combine harvester of the type specified above which is simple in structure and easily dismantled into different units of relatively small size, thus enabling the assembly, disassembly and transportation of the machine to be effected quickly and simply.

In achieving this object, the present invention provides a combine harvester of the aforesaid type, the main characteristic of which is that the axial-flow threshing and separating unit is mounted transversely relative to the longitudinal axis of the machine on a structure fixed to the cutting table.

By virtue of this characteristic, the whole unit formed by the cutting table and the threshing and separating unit may be easily separated from the remainder of the machine.

According to another preferred characteristic, the structure which carries the threshing and separating unit of the combine harvester is fixed releasably to the cutting table.

Due to this additional feature, the threshing and separating unit may be removed from the cutting table, further simplifying transportation of the machine.

Further characteristics and advantages of the invention will be apparent from the following description with reference to the attached drawings, which are supplied purely by way of non-limiting example, in which:

FIG. 2 is a section along the line II—II of FIG. 1, and

FIG. 3 shows, diagrammatically and on an enlarged scale, a detail of FIG. 1.

Figure 1:
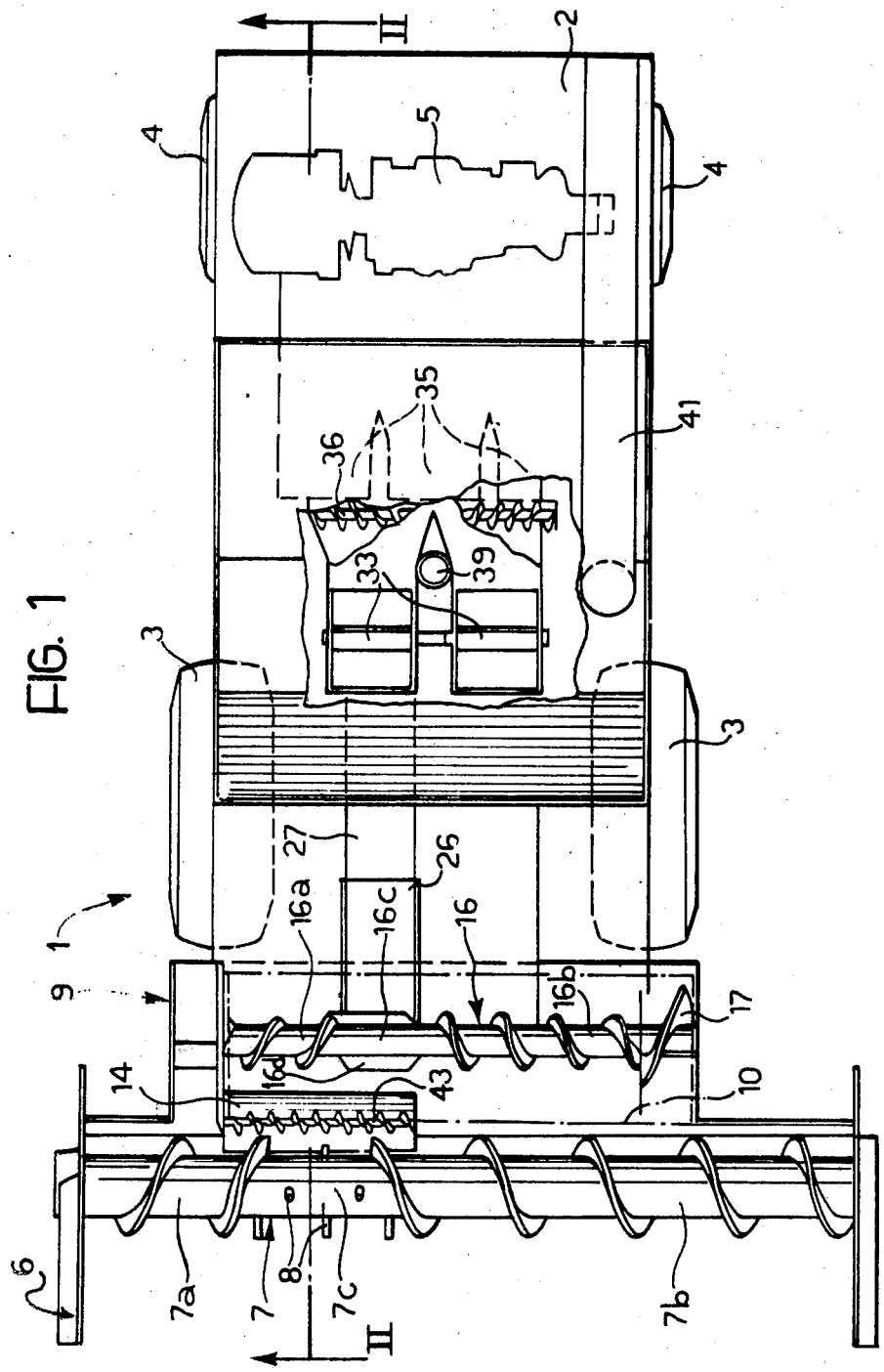
FIG. 1 is a diagrammatic plan view of a combine harvester according to the present invention.

In the drawings, there is shown, generally indicated 1, a combine harvester including a chassis 2, which is supported by front and rear wheels 3,4, and an internal combustion engine 5.

At the front, the combine harvester 1 has a cutting table 6 which includes a known type of feed auger 7 with retractable fingers 8 (also of known type).

To the cutting table 6 is fixed releasably a structure 9 which carries an axial-flow threshing and separating unit generally indicated 10.

The threshing and separating unit 10, which is of known type, comprises a threshing and separating cylinder 11 disposed transversely relative to the longitudinal axis of the machine, a counter-beater 12 formed by a concave grille which surrounds a lower part of one portion of the threshing and separating cylinder 11, and a separator casing 13 which is formed by a tubular grille surrounding that portion of the cylinder 11 not covered by the counter-beater 12.

A transverse feed cylinder 14 is located upstream of the threshing and separating unit 10 for receiving the crop from the auger 7 and conveying it to the unit 10.

As shown in FIG. 1, the feed auger 7 has two sections 7a,7b with spirals converging centrally towards an intermediate section 7c which is provided with fingers 8 and in correspondence with which the transverse feed cylinder 14 is located.

A collection recess 15 is located beneath the unit 10 and houses a transverse auger 16.

As shown in FIG. 1, in which the threshing and separating unit 10 has been shown diagrammatically by broken lines for the sake of clarity, the transverse auger 16 comprises two sections 16a, 16b with spirals which converge centrally towards an intermediate section 16c incorporating two paddles 16d.

A greater-diameter transverse auger 17 is fitted coaxially with the auger 16 and adjacent the delivery end of the threshing and separating unit 10, to discharge the straw emerging from the unit 10.

Figures 2, 3:
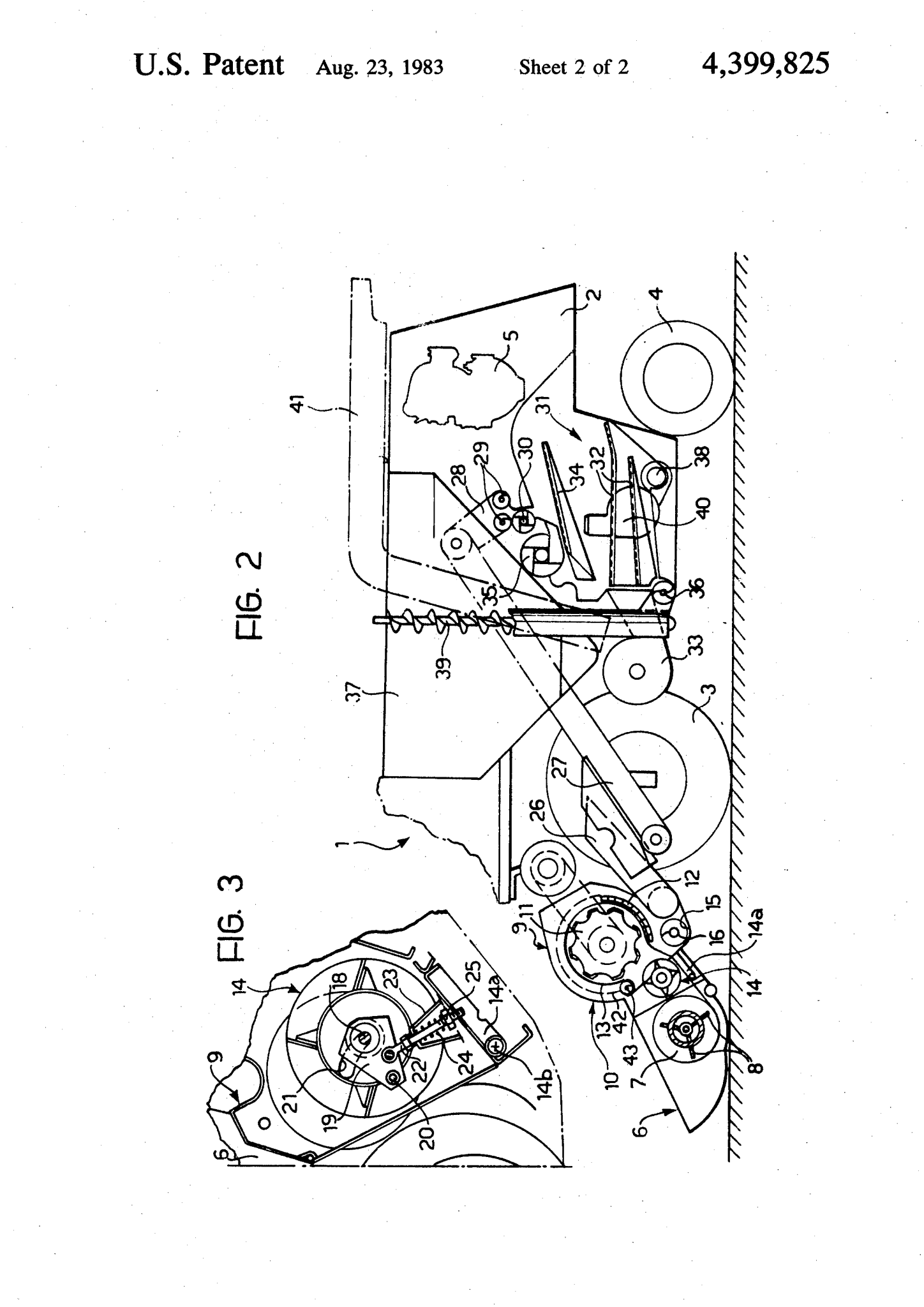

As shown in FIG. 3, the transverse feed cylinder 14 is mounted on a shaft 18 which is fixed at each end to a plate 19 articulated about a horizontal transverse axis 20 to a front part of the structure 9 carrying the threshing and separating unit 10.

The ends of the shaft 18 are slidable in two guide slots 21 made laterally in this structure.

To each plate 19 there is also articulated a tie rod 22 which is fitted slidingly in a support 23 with a part (not visible in FIG. 3) which is fixed to the structure 9.

To each tie rod 22 is connected a spring 24 which is interposed between the support 23 and an engagement member 25 fixed to the rod 22.

By virtue of the particular structure described above, the transverse feed cylinder 14 can oscillate on its resilient suspension and adapt to the volume of the crop being fed from the auger 7.

Beneath the feed cylinder 14 is located a flap 14a which is articulated to the structure 9 about a transverse axis 14b and is resiliently biassed to a closed position where it is held by a trip device (not illustrated). The flap 14a opens downwards when it is hit sharply by a hard body, such as a stone, preventing the latter from being pushed under the cylinder 11.

The combine harvester 1 includes a pair of blade elevators 26,27 which are arranged in series to receive the crop fed from the auger 16 by the paddles 16d in the section 16c, and carry it to a delivery end 28 next to the crop cleaning means of the machine.

Next to the delivery end 28 of the blade elevator 27 are located two contra-rotating augers 29, the axes of which extend transversely in a horizontal plane.

The purpose of the augers 29 is to distribute the crop across the whole width of the machine.

Below this is arranged a blade-type transverse accelerator roller 30 which accelerates the descent of the crop from the augers 29 to the cleaning means of the machine, generally indicated 31.

The cleaning means 31 comprise two superimposed cleaning screens 32 of known type associated with two fans 33 which direct an upward blast of air at the crop falling onto the screens 32.

Above the screens 32 and below the accelerator roller 30 is located a shaking chute 34 which conveys the crop to the screens 32.

Associated with the chute 34 are three fans 35 (only one of which is shown in FIG. 2) which direct an upward blast of air at the crop falling onto the shaking chute 34.

Below the screens 32 are arranged an auger 36 for carrying the clean grain to a storage tank 37 of the machine, and an auger 38 for recovered material.

The auger 36 for transporting the clean grain to the storage tank 37 is associated with a screw-type elevator 39, whilst the auger 38 for the recovered material is associated with a centrifugal beater 40, of known type, which causes the material thus conveyed to fall onto the cleaning screens 32 again. The elevator 39 is arranged vertically in the centre of the storage tank 37, to ensure even filling of the latter.

The combine harvester further includes a known type of swivelling conveyor 41 for discharging the grain from the storage tank 37.

The threshing and separating unit 10 is provided with a sweeping device of known type, shown diagrammatically in FIG. 2 by reference numeral 42, for removing the material which is separated by the upper portion of the grille forming the separator casing 13, and conveying it directly towards the collection recess 15 or a transverse auger 43 (see also FIG. 1) which is located in a channel-shaped wall located above and in front of the entrance to the unit 10. The auger 43 transports the material towards the collection recess (15).

The operation of the combine harvester described above is as follows:

the crop is conveyed from the transverse auger 7 to the feed cylinder 14 and from this to the threshing and separating unit 10.

More precisely, with reference to FIG. 1 and the feed direction of the machine, the crop is fed by the feed cylinder 14 to the right-hand side of the threshing and separating unit 10.

Once it has entered the space between the threshing and separating cylinder 11 and the counter-beater 12 and separator casing 13, the crop follows a helical path around the cylinder 11 moving axially towards the delivery end of the latter.

The straw, or any material over a certain length, is discharged into the auger 17 and thrown outwards to the ground to form a windrow alongside the machine.

The grain separated by the counter-beater 12 and the separator 13 is collected in the recess 15, where the sections 16a, 16b of the auger feed it to the part of the recess 15 corresponding to the middle section 16c of the auger 16.

The grain concentrated in the section 16c of the auger 16 is thrust by the paddles 16d towards the blade elevator 26, and is transported by the latter, and the blade elevator 27, to the delivery end 28 and the contra-rotating augers 29, which distribute the grain across the whole width of the machine.

The accelerator roller 30, which is of the rubber paddle type, rotates at high speed and accelerates the fall of the grain onto the shaking chute 34. As it falls, the grain is subjected to the upward blast of air produced by the three fans 35, and the majority of the light material is removed and discharged to the ground.

The crop passes from the shaking chute 34 to the cleaning screens 32 of conventional type where it is subjected to the blast of air produced by the fans 33. Thus, the lighter material is discharged to the ground whilst the clean grain is collected by the auger 36 which feeds it, via the screw elevator 39, to the storage tank 37 of the machine.

The material which has been collected by the auger 38 is recycled by the centrifugal beater 40.

The combine harvester according to the present invention has a structure which can be broken down into three main units: the cutting table 6, the threshing and separating unit support structure 9, and the rear part of the machine with the motor unit 5, the cleaning means 31 and the grain storage tank 37.

This enables considerable simplification of the assembly, disassembly and transportation of the machine.

The cylinder 14 may comprise a cylinder with retractable fingers, or a bladed cylinder.

What is claimed is:

1. A combine harvester comprising a cutting table, an axial flow through threshing and separating unit which includes a threshing and separating cylinder, a counter-beater substantially in the form of a concave grill surrounding a lower part of a first portion said threshing separating cylinder, and a separator casing substantially in the form of a tubular grille surrounding a second portion of said threshing and separating cylinder, a support structure fixed to said cutting table and supporting said threshing and separating unit and with the axis of said threshing cylinder being disposed transversely with respect to the longitudinal axis of the compound harvester, a pair of spaced apart plates pivoted about a horizontal transverse axis to the front of said support structure, a shaft having the opposite end thereof carried by said plates with each end of said shaft being slidably disposed in a guide slot in said structure, a transverse feed cylinder mounted on said shaft upstream of said threshing and separating unit to feed a harvested crop through said unit and resilient suspension means for resiliently supporting said plates comprising a support secured to said support structure, a pair of rods articulated to said plates respectfully, and being slidably mounted in said support, an engagement member secured to each rod and resilient means interposed between each engagement member and said support.

2. A combine harvester as set forth in claim 1 further comprising a flap pivotally mounted on said support structure about a horizontal transverse axis for opening and closing an aperture in said cutting table below said feed cylinder, said flap being resiliently biased to a raised closed position and opening downwardly for the removal of foreign bodies.

* * * * *